United States Patent
Bacon et al.

(10) Patent No.: US 7,269,412 B2
(45) Date of Patent: Sep. 11, 2007

(54) CALLER IDENTIFICATION DEVICE AND METHOD OF OPERATION THEREOF

(75) Inventors: James Bacon, Norcross, GA (US); John H. Aghajanian, Alpharetta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 44 days.

(21) Appl. No.: 10/449,571

(22) Filed: May 29, 2003

(65) Prior Publication Data

US 2004/0242212 A1 Dec. 2, 2004

(51) Int. Cl.
*H04M 3/42* (2006.01)

(52) U.S. Cl. .................. 455/415; 455/413; 455/414.1; 455/417; 455/550.1; 455/551; 455/412.1; 455/412.2; 379/142.02; 379/142.04

(58) Field of Classification Search .............. 455/415, 455/417, 418, 425, 566, 567, 569.2, 575.9, 455/95, 183.1, 414.1, 414.4, 412.1, 412.2, 455/413, 550.1, 551; 379/142.01, 142.02, 379/142.03, 142.04, 142.05, 142.06, 142.08, 379/142.17, 170, 142.07, 142.09, 142.1, 379/142.11, 156, 157, 372, 373.01, 373.02, 379/374.03, 376, 207.02, 207.15; 370/268, 370/269, 494, 495, 497; D14/141.3
See application file for complete search history.

(56) References Cited

U.S. PATENT DOCUMENTS

| 4,266,098 A | 5/1981 | Novak |
| 4,268,722 A | 5/1981 | Little et al. |
| 4,277,649 A | 7/1981 | Sheinbein |
| 4,582,956 A | 4/1986 | Doughty |
| 4,649,433 A | 3/1987 | Verhoeven |
| 4,649,533 A | 3/1987 | Chorley et al. |
| 4,663,777 A | 5/1987 | Szeto |
| 4,698,839 A | 10/1987 | DeVaney et al. |

(Continued)

FOREIGN PATENT DOCUMENTS

EP 0 821 511 A1 1/1998

(Continued)

OTHER PUBLICATIONS

Mark H. Norris, Transmitter Architectures, 1998,IEE, pp. 4/1-4/6.*

(Continued)

*Primary Examiner*—Joseph Feild
*Assistant Examiner*—Olumide Aibade-Akonai
(74) *Attorney, Agent, or Firm*—Cantor Colburn LLP

(57) ABSTRACT

A self powered caller identification device (CID) for a cellular telephone system (CTS) includes a receiver, a transmitter and a processor, all of which being adapted to provide access to the content of a data channel and to deny access to the voice services of a voice channel. The receiver is responsive to the data signal in the data channel and the processor is responsive to identify the CID to the CTS. The CID answers a call from the CTS in response to the call being a data signal and fails to answer the call in response to an attempted connection to the voice services of the voice channel. A display at the CID is responsive to the processor to display the content of the data signal thereby identifying the caller to the user of the CID.

7 Claims, 6 Drawing Sheets

U.S. PATENT DOCUMENTS

| | | |
|---|---|---|
| 4,791,664 A | 12/1988 | Lutz et al. |
| 4,797,911 A | 1/1989 | Szlam et al. |
| 4,802,202 A | 1/1989 | Takahashi et al. |
| 4,817,133 A | 3/1989 | Takahashi et al. |
| 4,823,304 A | 4/1989 | Frantz et al. |
| 4,845,743 A | 7/1989 | Lutz |
| 4,850,013 A | 7/1989 | Rose |
| 4,850,103 A | 7/1989 | Takemoto et al. |
| 4,955,075 A | 9/1990 | Anderson |
| 4,995,075 A | 2/1991 | Angiolillo-Bent |
| 5,029,196 A | 7/1991 | Morganstein |
| 5,109,405 A | 4/1992 | Morganstein |
| 5,121,423 A | 6/1992 | Morihiro et al. |
| 5,151,929 A | 9/1992 | Wolf |
| 5,157,712 A | 10/1992 | Wallen, Jr. |
| 5,161,181 A | 11/1992 | Zwick |
| 5,200,994 A | 4/1993 | Sasano et al. |
| 5,206,901 A | 4/1993 | Harlow |
| 5,260,987 A | 11/1993 | Mauger |
| 5,263,084 A | 11/1993 | Chaput et al. |
| 5,265,145 A | 11/1993 | Lim |
| 5,274,699 A | 12/1993 | Ranz |
| 5,278,894 A | 1/1994 | Shaw |
| 5,289,542 A | 2/1994 | Kessler |
| 5,315,650 A | 5/1994 | Smith et al. |
| 5,338,889 A | 8/1994 | Vora et al. |
| 5,341,411 A | 8/1994 | Hashimoto |
| 5,347,574 A | 9/1994 | Morganstein |
| 5,361,295 A | 11/1994 | Solomon et al. |
| 5,383,466 A | 1/1995 | Partika |
| 5,386,460 A | 1/1995 | Boakes et al. |
| 5,388,150 A | 2/1995 | Schneyer et al. |
| 5,413,605 A | 5/1995 | Ashby et al. |
| 5,420,914 A | 5/1995 | Blumhardt |
| 5,420,920 A | 5/1995 | Capper et al. |
| 5,425,076 A | 6/1995 | Knippelmier |
| 5,425,089 A | 6/1995 | Chan et al. |
| 5,430,719 A | 7/1995 | Weisser, Jr. |
| 5,446,785 A | 8/1995 | Hirai |
| 5,452,089 A | 9/1995 | Bushman |
| 5,452,346 A | 9/1995 | Miyamoto |
| 5,459,779 A | 10/1995 | Backaus et al. |
| 5,466,785 A | 11/1995 | De Framond |
| 5,467,388 A | 11/1995 | Redd, Jr. et al. |
| 5,475,748 A | 12/1995 | Jones |
| 5,481,594 A | 1/1996 | Shen et al. |
| 5,481,599 A | 1/1996 | MacAllister et al. |
| 5,481,602 A | 1/1996 | Griffiths et al. |
| 5,490,205 A | 2/1996 | Kondo et al. |
| 5,497,414 A | 3/1996 | Bartholomew |
| 5,502,762 A | 3/1996 | Andrew |
| 5,506,893 A | 4/1996 | Buscher et al. |
| 5,511,111 A | 4/1996 | Serbetcioglu et al. |
| 5,530,741 A | 6/1996 | Rubin |
| 5,533,106 A | 7/1996 | Blumhardt |
| 5,535,265 A | 7/1996 | Suwandhaputra |
| 5,536,265 A | 7/1996 | Van den Bergh et al. |
| 5,546,447 A | 8/1996 | Skarbo et al. |
| 5,546,477 A | 8/1996 | Knowles et al. |
| 5,550,900 A | 8/1996 | Ensor et al. |
| 5,550,905 A | 8/1996 | Silverman |
| 5,563,935 A | 10/1996 | Small |
| 5,563,936 A | 10/1996 | Washington |
| 5,602,908 A | 2/1997 | Fan |
| 5,608,788 A | 3/1997 | Demlow et al. |
| 5,619,561 A | 4/1997 | Reese |
| 5,631,950 A | 5/1997 | Brown |
| 5,636,269 A | 6/1997 | Eisdorfer |
| 5,644,629 A | 7/1997 | Chow |
| 5,646,979 A | 7/1997 | Knuth |
| 5,657,372 A * | 8/1997 | Ahlberg et al. ......... 455/414.1 |
| 5,668,852 A | 9/1997 | Holmes .................... 405/31.2 |
| 5,696,809 A | 12/1997 | Voit |
| 5,696,815 A | 12/1997 | Smyk |
| 5,699,523 A | 12/1997 | Li et al. |
| 5,701,301 A | 12/1997 | Weisser, Jr. |
| 5,703,934 A | 12/1997 | Zicker et al. |
| H1714 H | 3/1998 | Partridge, III |
| 5,724,412 A | 3/1998 | Srinivasan |
| 5,734,706 A | 3/1998 | Windsor et al. |
| 5,754,635 A | 5/1998 | Kim |
| 5,754,636 A | 5/1998 | Bayless et al. |
| 5,754,775 A | 5/1998 | Adamson et al. |
| 5,771,281 A | 6/1998 | Batten, Jr. |
| 5,771,283 A | 6/1998 | Chang |
| 5,781,621 A | 7/1998 | Lim et al. |
| 5,784,444 A | 7/1998 | Snyder et al. |
| 5,796,806 A | 8/1998 | Birckbichler |
| 5,799,072 A | 8/1998 | Vulcan |
| 5,802,160 A | 9/1998 | Kugell |
| 5,802,251 A | 9/1998 | Cohen et al. |
| 5,805,587 A | 9/1998 | Norris et al. |
| 5,805,682 A | 9/1998 | Voit et al. |
| 5,805,997 A | 9/1998 | Farris |
| 5,809,128 A | 9/1998 | McMullin |
| 5,812,533 A | 9/1998 | Cox et al. |
| 5,812,649 A * | 9/1998 | Shen ....................... 379/142.14 |
| 5,838,774 A | 11/1998 | Weisser, Jr. |
| 5,841,838 A | 11/1998 | Itoh et al. |
| 5,841,850 A | 11/1998 | Fan |
| 5,848,142 A | 12/1998 | Yaker |
| 5,850,435 A | 12/1998 | Devillier |
| 5,850,436 A | 12/1998 | Rosen et al. |
| 5,857,017 A | 1/1999 | Ohi et al. |
| 5,859,903 A | 1/1999 | Lee |
| 5,872,834 A | 2/1999 | Teitelbaum |
| 5,878,036 A | 3/1999 | Spratz et al. |
| 5,883,942 A | 3/1999 | Lim et al. |
| 5,884,144 A | 3/1999 | Chavez, Jr. et al. |
| 5,894,504 A | 4/1999 | Alfred et al. |
| 5,901,209 A | 5/1999 | Tannenbaum et al. |
| 5,901,212 A | 5/1999 | True et al. |
| 5,903,636 A | 5/1999 | Malik |
| 5,905,794 A | 5/1999 | Gunn et al. |
| 5,907,596 A | 5/1999 | Karnowski |
| 5,907,604 A | 5/1999 | Hsu |
| 5,915,000 A | 6/1999 | Nguyen et al. |
| 5,917,817 A | 6/1999 | Dunn et al. |
| 5,923,744 A | 7/1999 | Cheng |
| 5,930,701 A | 7/1999 | Skog |
| 5,940,484 A | 8/1999 | DeFazio et al. |
| 5,946,363 A | 8/1999 | Rominger et al. |
| 5,946,636 A | 8/1999 | Uyeno et al. |
| 5,946,684 A | 8/1999 | Lund |
| D413,605 S | 9/1999 | Thomas |
| 5,948,040 A | 9/1999 | DeLorme et al. |
| 5,949,865 A | 9/1999 | Fusinato |
| 5,953,399 A | 9/1999 | Farris et al. |
| 5,953,657 A | 9/1999 | Ghisler |
| 5,963,626 A | 10/1999 | Nabkel |
| 5,969,647 A | 10/1999 | Mou et al. |
| 5,970,127 A | 10/1999 | Smith et al. |
| 5,970,128 A | 10/1999 | Kim |
| 5,974,309 A | 10/1999 | Foti |
| 5,982,866 A | 11/1999 | Kowalski |
| 5,991,377 A | 11/1999 | Malik |
| 5,999,207 A | 12/1999 | Rodriguez et al. |
| 5,999,599 A | 12/1999 | Shaffer et al. |
| 5,999,613 A | 12/1999 | Nabkel et al. |
| 6,006,087 A | 12/1999 | Amin |
| 6,009,321 A | 12/1999 | Wang et al. |
| 6,014,559 A | 1/2000 | Amin |
| 6,016,512 A | 1/2000 | Huitema |
| 6,021,188 A | 2/2000 | Meg |

| | | | |
|---|---|---|---|
| 6,021,427 A | 2/2000 | Spagna et al. | |
| 6,031,899 A | 2/2000 | Wu | |
| 6,044,148 A | 3/2000 | Bleile | |
| 6,049,291 A | 4/2000 | Kikinis | |
| 6,058,171 A | 5/2000 | Hoopes | |
| 6,061,434 A | 5/2000 | Corbett | |
| 6,061,566 A | 5/2000 | Friman | |
| 6,064,876 A * | 5/2000 | Ishida et al. | 455/412.1 |
| 6,065,844 A | 5/2000 | Chen | |
| 6,072,859 A | 6/2000 | Kong | |
| 6,078,581 A | 6/2000 | Shtivelman et al. | |
| 6,091,947 A | 7/2000 | Sumner | |
| 6,094,478 A | 7/2000 | Shepherd et al. | |
| 6,094,573 A | 7/2000 | Heinonen et al. | |
| 6,094,574 A | 7/2000 | Vance et al. | 455/415 |
| 6,101,246 A | 8/2000 | Heinmiller et al. | |
| 6,104,784 A | 8/2000 | Robbins | |
| 6,104,800 A | 8/2000 | Benson | |
| 6,108,630 A | 8/2000 | Kuechler et al. | |
| 6,111,939 A | 8/2000 | Brabanec | |
| 6,134,235 A | 10/2000 | Goldman et al. | |
| 6,134,311 A | 10/2000 | Ekstrom | |
| 6,137,870 A | 10/2000 | Scherer | |
| 6,137,871 A | 10/2000 | Maier et al. | |
| 6,141,341 A | 10/2000 | Jones | |
| 6,141,409 A | 10/2000 | Madoch et al. | |
| 6,144,644 A | 11/2000 | Bajzath et al. | |
| 6,154,531 A | 11/2000 | Clapper | |
| 6,160,876 A | 12/2000 | Moss et al. | |
| 6,161,021 A | 12/2000 | Akpa | |
| 6,163,595 A | 12/2000 | Parker et al. | |
| 6,163,691 A | 12/2000 | Buettner et al. | |
| 6,167,254 A | 12/2000 | Chavez, Jr. et al. | |
| 6,173,049 B1 | 1/2001 | Malik | |
| 6,178,232 B1 | 1/2001 | Latter et al. | |
| 6,181,928 B1 | 1/2001 | Moon | |
| D437,879 S | 2/2001 | Weinandt | |
| 6,185,289 B1 | 2/2001 | Hetz et al. | |
| 6,192,115 B1 | 2/2001 | Toy et al. | |
| 6,192,116 B1 | 2/2001 | Mayak | |
| 6,198,480 B1 | 3/2001 | Cotugno et al. | |
| 6,198,920 B1 | 3/2001 | Doviak et al. | |
| 6,202,023 B1 | 3/2001 | Hancock et al. | |
| 6,219,407 B1 | 4/2001 | Kanevsky et al. | |
| 6,226,367 B1 | 5/2001 | Smith et al. | |
| 6,230,006 B1 | 5/2001 | Keenan et al. | |
| 6,233,325 B1 | 5/2001 | Frech et al. | |
| 6,236,975 B1 | 5/2001 | Boe et al. | |
| 6,243,448 B1 | 6/2001 | Corbett et al. | |
| 6,243,461 B1 | 6/2001 | Hwang | |
| 6,252,952 B1 | 6/2001 | Kung et al. | |
| 6,256,671 B1 | 7/2001 | Strentzch et al. | |
| 6,262,987 B1 | 7/2001 | Mogul | |
| 6,266,399 B1 | 7/2001 | Weller et al. | |
| 6,278,704 B1 | 8/2001 | Creamer et al. | |
| 6,278,862 B1 | 8/2001 | Henderson | 455/31.1 |
| 6,282,275 B1 | 8/2001 | Gurbani et al. | |
| 6,292,479 B1 | 9/2001 | Bartholomew et al. | |
| 6,292,549 B1 | 9/2001 | Lung et al. | |
| 6,295,502 B1 | 9/2001 | Hancock et al. | |
| 6,301,350 B1 | 10/2001 | Henningson et al. | |
| 6,304,644 B2 | 10/2001 | Karnowski | |
| 6,310,943 B1 | 10/2001 | Kowalski | |
| 6,311,057 B1 | 10/2001 | Barvesten | |
| 6,317,488 B1 | 11/2001 | DePond et al. | |
| 6,317,781 B1 | 11/2001 | De Boor et al. | |
| 6,324,263 B1 * | 11/2001 | Sherwood et al. | 379/88.19 |
| 6,324,271 B1 | 11/2001 | Sawyer et al. | |
| 6,327,347 B1 | 12/2001 | Gutzmann | |
| 6,332,021 B2 | 12/2001 | Latter et al. | |
| 6,333,973 B1 | 12/2001 | Smith et al. | |
| 6,337,979 B1 | 1/2002 | Nakayasu | |
| 6,339,639 B1 | 1/2002 | Henderson | |
| 6,341,161 B1 | 1/2002 | Latter et al. | |
| 6,345,187 B1 | 2/2002 | Berthoud et al. | |
| 6,347,136 B1 | 2/2002 | Horan | |
| 6,351,637 B1 | 2/2002 | Lee | |
| 6,353,664 B1 | 3/2002 | Cannon et al. | |
| 6,361,637 B2 | 3/2002 | Martin et al. | |
| 6,363,411 B1 | 3/2002 | Dugan et al. | |
| 6,366,661 B1 | 4/2002 | Devillier et al. | |
| 6,366,772 B1 | 4/2002 | Arnson | |
| 6,377,807 B1 | 4/2002 | Iparrea et al. | |
| 6,377,979 B1 | 4/2002 | Yamashita et al. | |
| 6,389,124 B1 | 5/2002 | Schnarel et al. | |
| 6,400,809 B1 | 6/2002 | Bossemeyer, Jr. et al. | |
| 6,400,947 B1 | 6/2002 | Bright et al. | |
| 6,404,868 B1 | 6/2002 | Beamish et al. | |
| 6,404,875 B2 | 6/2002 | Malik et al. | |
| 6,411,692 B1 | 6/2002 | Scherer | |
| 6,421,425 B1 | 7/2002 | Bossi et al. | |
| 6,422,263 B1 | 7/2002 | Spicer | |
| 6,427,003 B1 | 7/2002 | Corbett et al. | |
| 6,427,064 B1 | 7/2002 | Henderson | 455/31.1 |
| 6,434,394 B1 | 8/2002 | Grundvig et al. | |
| 6,437,879 B1 | 8/2002 | Temple | |
| 6,438,216 B1 | 8/2002 | Aktas | |
| 6,438,584 B1 | 8/2002 | Powers | |
| 6,442,249 B1 | 8/2002 | Miller, Jr. | |
| 6,442,262 B1 | 8/2002 | Moss et al. | |
| 6,442,263 B1 | 8/2002 | Beaton et al. | |
| 6,442,283 B1 | 8/2002 | Tewfik et al. | |
| 6,445,781 B1 | 9/2002 | Heinmiller et al. | |
| 6,449,351 B1 | 9/2002 | Moss et al. | |
| 6,449,361 B1 | 9/2002 | Okuda | |
| 6,462,646 B2 | 10/2002 | Helferich | |
| 6,463,131 B1 * | 10/2002 | French-St. George et al. | 379/88.23 |
| 6,477,246 B1 | 11/2002 | Dolan et al. | |
| 6,480,589 B1 | 11/2002 | Lee et al. | |
| 6,483,898 B2 | 11/2002 | Lew et al. | |
| 6,493,430 B2 | 12/2002 | Leuca et al. | |
| 6,493,431 B1 | 12/2002 | Troen-Krasnow et al. | |
| 6,493,437 B1 | 12/2002 | Olshansky | |
| 6,493,439 B2 | 12/2002 | Lung et al. | |
| 6,494,953 B2 | 12/2002 | Hayes et al. | |
| 6,496,569 B2 | 12/2002 | Pelletier et al. | |
| 6,496,571 B1 | 12/2002 | Wilson | |
| 6,496,692 B1 | 12/2002 | Shanahan | |
| 6,498,841 B2 | 12/2002 | Bull et al. | |
| 6,507,737 B1 | 1/2003 | Laham et al. | |
| 6,529,500 B1 | 3/2003 | Pandharipande | |
| 6,529,591 B1 | 3/2003 | Dosani et al. | |
| 6,532,490 B1 | 3/2003 | Lewis et al. | |
| 6,539,080 B1 | 3/2003 | Bruce et al. | |
| 6,542,583 B1 | 4/2003 | Taylor | |
| 6,542,586 B1 | 4/2003 | Helstab | |
| 6,542,591 B1 | 4/2003 | Amro et al. | |
| 6,542,602 B1 | 4/2003 | Elazar | |
| 6,542,812 B1 | 4/2003 | Obradovich et al. | |
| 6,546,092 B2 | 4/2003 | Corbett et al. | |
| 6,549,621 B1 | 4/2003 | Christie, IV et al. | |
| 6,553,110 B1 | 4/2003 | Peng | |
| 6,553,221 B2 | 4/2003 | Nakamura et al. | |
| 6,556,540 B1 | 4/2003 | Mawhinney et al. | |
| 6,560,317 B1 | 5/2003 | Quagliana | |
| 6,560,327 B1 | 5/2003 | McConnell | |
| 6,566,995 B2 | 5/2003 | Furuuchi et al. | |
| 6,570,971 B2 | 5/2003 | Latter et al. | |
| 6,570,974 B1 | 5/2003 | Gerszberg et al. | |
| 6,574,319 B2 | 6/2003 | Latter et al. | |
| 6,584,490 B1 | 6/2003 | Schuster et al. | |
| 6,587,458 B1 | 7/2003 | Burg et al. | |
| 6,597,905 B1 | 7/2003 | Hijii | |
| 6,603,840 B2 | 8/2003 | Fellingham et al. | |
| 6,608,891 B1 | 8/2003 | Pelletier et al. | |

| | | | | | |
|---|---|---|---|---|---|
| 6,618,474 B1 | 9/2003 | Reese | 7,095,715 B2 | 8/2006 | Buckman et al. |
| 6,625,595 B1 | 9/2003 | Anderson et al. | 7,097,169 B2 | 8/2006 | Mueller |
| 6,631,181 B1 | 10/2003 | Bates et al. | 2001/0005854 A1 | 6/2001 | Murata et al. |
| 6,633,633 B1 | 10/2003 | Bedingfield | 2001/0044898 A1 | 11/2001 | Benussi et al. |
| 6,639,979 B1 | 10/2003 | Kim | 2002/0009184 A1 | 1/2002 | Shnier |
| 6,650,743 B2 | 11/2003 | Heinmiller et al. | 2002/0016748 A1 | 2/2002 | Emodi et al. |
| 6,659,597 B2 | 12/2003 | Murata et al. | 2002/0041605 A1 | 4/2002 | Benussi et al. |
| 6,661,785 B1 | 12/2003 | Zhang et al. | 2002/0055926 A1 | 5/2002 | Dan et al. |
| 6,665,388 B2 | 12/2003 | Bedingfield | 2002/0067816 A1 | 6/2002 | Bushnell |
| 6,683,870 B1 | 1/2004 | Archer | 2002/0077102 A1 | 6/2002 | Achuthan et al. |
| 6,687,341 B1 | 2/2004 | Koch et al. | 2002/0082050 A1 | 6/2002 | Mountney et al. |
| 6,697,357 B2 | 2/2004 | Emerson, III | 2002/0085687 A1 | 7/2002 | Contractor |
| 6,701,160 B1 | 3/2004 | Pinder et al. | 2002/0090933 A1 | 7/2002 | Rouse et al. |
| 6,718,021 B2 | 4/2004 | Crockett et al. | 2002/0094826 A1* | 7/2002 | Lee ............................ 455/457 |
| 6,721,407 B1 | 4/2004 | Michelena | 2002/0118812 A1 | 8/2002 | Contractor |
| 6,724,872 B1 | 4/2004 | Moore et al. | 2002/0119430 A1 | 8/2002 | Szynalski |
| 6,728,355 B2 | 4/2004 | Kowalski | 2002/0120629 A1 | 8/2002 | Leonard |
| 6,728,360 B1 | 4/2004 | Brennan | 2002/0122401 A1* | 9/2002 | Xiang et al. ................. 370/338 |
| 6,728,365 B1 | 4/2004 | Li et al. | 2002/0125929 A1 | 9/2002 | Chen et al. |
| 6,731,727 B2 | 5/2004 | Corbett et al. | 2002/0183098 A1 | 12/2002 | Lee et al. |
| 6,732,188 B1 | 5/2004 | Flockhart et al. | 2002/0188443 A1 | 12/2002 | Reddy et al. |
| 6,738,615 B1 | 5/2004 | Chow et al. | 2002/0191755 A1 | 12/2002 | Lew et al. |
| 6,748,058 B1 | 6/2004 | Schwend et al. | 2002/0196913 A1 | 12/2002 | Ruckart |
| 6,748,068 B1 | 6/2004 | Walsh et al. | 2002/0196914 A1 | 12/2002 | Ruckart |
| 6,751,457 B1 | 6/2004 | Martin | 2003/0007620 A1 | 1/2003 | Elsey et al. |
| 6,757,274 B1 | 6/2004 | Bedingfield et al. | 2003/0012353 A1 | 1/2003 | Tang et al. |
| 6,757,740 B1 | 6/2004 | Parekh et al. | 2003/0016143 A1 | 1/2003 | Ghazarian |
| 6,760,413 B2 | 7/2004 | Cannon et al. | 2003/0016800 A1 | 1/2003 | Fukuda |
| 6,765,998 B2 | 7/2004 | Bruce et al. | 2003/0021290 A1 | 1/2003 | Jones |
| 6,766,003 B2 | 7/2004 | Moss et al. | 2003/0022659 A1 | 1/2003 | Mun et al. |
| 6,768,792 B2 | 7/2004 | Brown et al. | 2003/0026413 A1 | 2/2003 | Brandt et al. |
| D494,953 S | 8/2004 | Leung | 2003/0026416 A1 | 2/2003 | Fusco |
| 6,771,754 B2 | 8/2004 | Pelletier et al. | 2003/0032414 A1 | 2/2003 | Melaku et al. |
| 6,771,755 B1 | 8/2004 | Simpson | 2003/0063730 A1 | 4/2003 | Woodring |
| 6,771,956 B1 | 8/2004 | Beeler | 2003/0063731 A1 | 4/2003 | Woodring |
| 6,775,366 B1 | 8/2004 | Cobbett et al. | 2003/0092384 A1 | 5/2003 | Ross, III |
| 6,775,540 B2 | 8/2004 | Iyer | 2003/0095650 A1 | 5/2003 | Mize |
| 6,778,524 B1 | 8/2004 | Augart | 2003/0119503 A1* | 6/2003 | Shohara et al. .............. 455/434 |
| 6,779,020 B1 | 8/2004 | Henrick | 2003/0133553 A1 | 7/2003 | Khahoo |
| 6,785,301 B1 | 8/2004 | Chapman et al. | 2003/0133653 A1 | 7/2003 | Khakoo et al. |
| 6,785,368 B1 | 8/2004 | Eason et al. | 2003/0135626 A1 | 7/2003 | Ray et al. |
| 6,785,540 B1 | 8/2004 | Wichelman | 2003/0148758 A1 | 8/2003 | McMullin |
| 6,792,266 B1 | 9/2004 | Masuda et al. | 2003/0152207 A1 | 8/2003 | Ryan |
| 6,798,841 B2 | 9/2004 | Hansen | 2003/0187949 A1 | 10/2003 | Bhatt et al. |
| 6,798,879 B1 | 9/2004 | Beham | 2003/0196206 A1 | 10/2003 | Shusman |
| 6,807,267 B2 | 10/2004 | Moss et al. | 2003/0198322 A1 | 10/2003 | White, Jr. |
| 6,810,077 B1 | 10/2004 | Dezonno | 2003/0215078 A1 | 11/2003 | Brahm et al. |
| 6,810,115 B2 | 10/2004 | Fukuda | 2004/0066928 A1* | 4/2004 | Leijonhufvud ......... 379/211.01 |
| 6,813,344 B1 | 11/2004 | Lemke | 2004/0083493 A1* | 4/2004 | Swisher et al. .............. 725/106 |
| 6,816,481 B1 | 11/2004 | Adams et al. | 2004/0101118 A1* | 5/2004 | Powell ..................... 379/142.1 |
| 6,818,474 B2 | 11/2004 | Kim et al. | 2004/0101124 A1 | 5/2004 | Koch et al. |
| 6,826,271 B1 | 11/2004 | Kanabar et al. | 2004/0109558 A1 | 6/2004 | Koch |
| 6,830,595 B2 | 12/2004 | Reynolds, III | 2004/0114730 A1 | 6/2004 | Koch et al. |
| 6,831,974 B1 | 12/2004 | Watson et al. | 2004/0120478 A1 | 6/2004 | Reynolds et al. |
| 6,842,512 B2 | 1/2005 | Pedersen | 2004/0125929 A1* | 7/2004 | Pope ..................... 379/142.17 |
| 6,845,151 B2 | 1/2005 | Peng | 2004/0171370 A1* | 9/2004 | Natarajan ................... 455/413 |
| 6,845,512 B2 | 1/2005 | Horng et al. | 2004/0181587 A1 | 9/2004 | Cao et al. |
| 6,853,711 B2 | 2/2005 | Brisebois et al. | 2004/0192332 A1 | 9/2004 | Samn |
| 6,859,527 B1 | 2/2005 | Banks et al. | 2004/0202298 A1 | 10/2004 | Lopez et al. |
| 6,865,266 B1 | 3/2005 | Pershan | 2004/0202299 A1 | 10/2004 | Schwartz |
| 6,868,155 B1* | 3/2005 | Cannon et al. ........ 379/376.01 | 2004/0208301 A1 | 10/2004 | Urban |
| 6,888,927 B1 | 5/2005 | Cruickshank et al. | 2004/0208302 A1 | 10/2004 | Urban et al. |
| 6,888,972 B2 | 5/2005 | Berg et al. | 2004/0209604 A1 | 10/2004 | Urban et al. |
| 6,898,275 B2 | 5/2005 | Dolan et al. | 2004/0209605 A1 | 10/2004 | Urban et al. |
| 6,904,276 B1 | 6/2005 | Freeman et al. | 2004/0209640 A1 | 10/2004 | Urban et al. |
| 6,907,034 B1 | 6/2005 | Begis | 2004/0213207 A1 | 10/2004 | Silver et al. |
| 6,909,777 B2 | 6/2005 | Latter et al. | 2004/0233892 A1 | 11/2004 | Roberts |
| 6,914,953 B2 | 7/2005 | Boerstler | 2004/0242212 A1 | 12/2004 | Bacon |
| 6,922,411 B1 | 7/2005 | Taylor | 2004/0248560 A1 | 12/2004 | Bedingfield |
| 6,928,154 B1 | 8/2005 | Cheaito et al. | 2005/0073999 A1 | 4/2005 | Koch |
| 6,931,007 B2 | 8/2005 | Jones | 2005/0084084 A1 | 4/2005 | Cook et al. |
| 6,996,211 B2 | 2/2006 | Reynolds et al. | 2005/0100158 A1 | 5/2005 | Kreiner et al. |
| 7,027,408 B2 | 4/2006 | Nabkel et al. | 2005/0107074 A1 | 5/2005 | Zellner |

| | | |
|---|---|---|
| 2005/0147228 A1 | 7/2005 | Perrella |
| 2005/0152525 A1 | 7/2005 | Kent |
| 2006/0002540 A1 | 1/2006 | Kreiner et al. |
| 2006/0013375 A1 | 1/2006 | Smith et al. |
| 2006/0029209 A1 | 2/2006 | Moton et al. |

FOREIGN PATENT DOCUMENTS

| | | |
|---|---|---|
| KR | 2002-0014945 | 2/2002 |
| WO | 97/50225 | 12/1997 |
| WO | WO97/50225 | 12/1997 |

OTHER PUBLICATIONS

J. Boswell, G. Lingenauber, An Advanced HF Receiver Design, Jul. 1994, IEE, Conference Publication, No. 392, pp. 41-47.*

Talking Caller ID, SMARTHOME, http://www.smarthome.com/5154.html, pp. 1-3, Nov. 5, 2001.

OKI Silicon Solutions Company, Japan Site, "Multi-Lingual Text-to-Speech Processor ML2110". http:www.//oki.com/semi/English/ml2110/htm, pp. 1-6, Nov. 1, 2001.

Voice-6090 "Talking Caller ID", Aastra Telecom-Talking Caller ID-Voice 9090, http://www.aastra.com/products/callerids/voicecallerid/be-6090.html, pp. 1-2, Nov. 5, 2001.

Voice-9090 "Talking Caller ID", Aastra Telecom-Talking Caller ID-Voice 9090, http://ww/www.aastra.com/products/callerids/voicecallerid/be-9090.html, pp. 1-2, Nov. 5, 2001.

Talking Caller ID, Stealth Software, http://www.talkingcallerid.com/, Talking Caller ID-Featuring Talking, Paging, Email, Voice Mail, Blocking, Text-to-speech, pp. 1-4, Nov. 5, 2001.

"Address Allocation for Private Internets", Rekhter et al., pp. 1-8, Feb. 1996.

U.S. Appl. No. 10/032,724, filed Dec. 27, 2001, entitled "Voice Caller ID", Inventor, Robert T. Moton et al.

U.S. Appl. No. 10/884,504, filed Jul. 2, 2004, entitled "Real-Time Customer Service Representative Workload Management", Inventor, Barrett Kreiner et al.

"RBS 884 Pico System Description", Author Unknown, Ericsson 1/1551-AE/LZB 119 2269 Uae Rev A, Apr. 23, 1998.

Slawson, "Caller ID Basics" Caller ID, http://www.testmark.com/develop/ml_callerid_cnt.html, Oct. 22, 2003.

"SIP: Session Initiation Protocol", Handley et al., Mar. 1999*.

"The IP Network Address Translator (NAT)", Egevang et al., May 1994*.

Bellcore Specification TR-NWT-000031, Calling Number Delivery, Issue 4, Dec. 1992.

Bellcore Specification TR-NWT-001188, Calling Name Delivery Generic Requirements, Issue 1, Dec. 1991.

Mark H. Norris, Transmitter Architectures, 1998, IEE, pp. 4/1-4/6*.

J. Boswell, G. Lingenauber, An Advanced HF Receiver Design, Jul. 1994, IEE, Conference Publication No. 392, pp. 41-47*.

U.S. Appl. No. 10/174,026, filed Jun. 18, 2002, entitled "Method for Using AIN to Deliver Called ID to Alpha-Numeric Pagers as well as Other Wireless Devices", for Calls Delivered to Wireless Networks, Inventor, James C. Bedinfield, Sr., et al.

U.S. Appl. No. 10/144,555, filed May 13, 2002, entitled "Third Party Content for Internet Called-ID Messages", Inventor, Koch et al.

U.S. Appl. No. 10/200,874, filed Jul. 23, 2002, entitled "System and Method for Gathering Information Related to a Geographic Location".

U.S. Appl. No. 10/201,042, filed Jul. 23, 2002, entitled "System and Method for Gathering Information Related to a Geographical Location of a Callee in a Public Switched Telephone Network".

U.S. Appl. No. 10/144,556, filed May 13, 2002, entitled "Internet Called-ID Integration", inventor, Koch et al.

U.S. Appl. No. 10/152,544, filed May 21, 2002, entitled "Telecommunications Device Ring Tone Apparatuses, Systems and Methods", inventor, Alston et al.

U.S. Appl. No. 09/992,165, filed Nov. 6, 2001, entitled "Caller Identification Queue for Wireless Telephones".

U.S. Appl. No. 10/891,883, filed Jul. 15, 2004, entitled "Methods of Providing Caller Identification Information and Related Registries and Radiotelephone Networks", inventor, Smith et al.

U.S. Appl. No. 10/200,906, filed Jul. 23, 2002, entitled "System and Method for Gathering Information Related to a Geographical Location of a Caller in a Public Switched Telephone Network".

U.S. Appl. No. 10/201,706, filed Jul. 23, 2002, entitled "System and Method for Gathering Information Related to a Geographical Location of a Caller in an Internet-Based Communication System".

U.S. Appl. No. 09/812,338, filed Mar. 19, 2001, entitled "Switch Communications Interface Unit for Telecommunications", inventor, Clayton M. Smith.

Farley et al., "Cellular Telephone Basics: AMPS and Beyond", TelecomWriting.com, Mar. 6, 2003, pp. 1-8.

"Time Division Multiple Access (TDMA)", International Engineering Consortium, Author Unknown, Mar. 6, 2003, pp. 1-2.

"Venture IP Telephone System" AASTRA (website) 2 pgs. http://www.aastra.com/products/callerids/voicecallerid/be-6060.html accessed on Aug 1, 2005.

"Venture IP Telephone System" AASTRA (website) 2 pgs. http://www.aastra.com/products/callerids/voicecallerid/be-6090.html accessed on Aug. 1, 2005.

"Venture IP Telephone System" AASTRA (website) 2 pgs. http://www.aastra.com/products/callerids/voicecallerid/be-9090.html accessed on Aug. 1, 2005.

SmartHome "The Caller ID System that Speaks for Itself!" (website) 3 pgs. http://www.smarthome.com/5154.html accessed on Aug. 19, 2006.

AASTRA Telecom "Voice-6090 Talking Caller ID" (website) 2 pgs. http://aastra.com/products/callerids/voicecallerid/be-6090.html accessed on Nov. 5, 2001.

AASTRA Telecom, Press Release, Aastra Telecom Introduces CNX Conference Bridge, Aug. 29, 2005, 1 page.

International Search Report PCT/US02/30068, Dec. 9, 2002.

International Search Report PCT/US02/29988, Sep. 23, 2002.

* cited by examiner

CALLER IDENTIFICATION DEVICE AND METHOD OF OPERATION THEREOF

BACKGROUND OF THE INVENTION

The present disclosure relates generally to a caller identification device, and particularly to a caller identification device for use on a digital cellular telephone system.

A cellular telephone system (CTS) provides mobile telephone service by employing a network of cell sites distributed over a wide area, with each cell site typically functioning to manage, send, and receive traffic from the mobiles in its geographical area to a cellular telephone switch. The cell site tower closest to the active mobile unit is typically the priority communication tower, with the cellular telephone system controlling how communication passes from one cell site to the next as the mobile unit crosses cell site boundaries. Voice communication with a mobile cellular telephone is achieved by first connecting with a data channel and then by connecting with a voice channel once a call is answered, which enables high traffic voice data channels to be reserved only for those calls that are received and answered by the cellular phone. Upon receipt of a page from the CTS, the cellphone reads the data channel content and replies with its location. The CTS then attempts to connect the cellphone with a voice channel for voice communication. If the cellphone answers the call, the voice channel connection is made and the call goes through. If the cellphone does not answer, the call is terminated. However, with either a successful or an unsuccessful call, the identification of the caller is available to the cellphone since that information is present in the data signal of the data channel or alternately via the voice channel. Thus, the identification of a caller to a cellphone user may be obtained from either a successful or an unsuccessful call. In taking advantage of this feature, some prepaid cellphone users use the cellphones as pagers, thereby enabling them to identify the caller without answering the call and to return the call using a lower cost landline phone system. Using a cellphone in this manner is costly to both the user and the cellphone service provider. The cellphone user must bear the cost of acquiring a highly functional cellphone that they do not use for all of its functionality, and the cellphone service provider must bear the acquisition cost associated with fully functional devices and maintenance costs associated with a cellular telephone system that is not receiving adequate compensation from the pager cellphone users. Accordingly, it would be advantageous to provide a device that is beneficial to both the pager cellphone user and the cellphone service provider.

SUMMARY OF THE INVENTION

In one embodiment, a self powered caller identification device (CID) for a cellular telephone system (CTS) includes a receiver, a transmitter and a processor, all of which being adapted to provide access to the content of a data channel or alternatively of a voice channel, and to deny access to the voice services of a voice channel. The receiver and transmitter are responsive to the data signal in both the data channel and the voice channel, and the processor is responsive to identify the CID to the CTS. The CID answers a call from the CTS in response to the call being a data signal and fails to answer the call in response to an attempted connection to the voice services of the voice channel. A display at the CID is responsive to the processor to display the content of the data signal thereby identifying the caller to the user of the CID.

In another embodiment, a method of identifying a caller at a device in signal communication with a cellular telephone system is disclosed. A page is received at the device from the cellular telephone system, and in response, the device, having an identification tag, replies with its location. In response to the reply, a call is received at the device. Upon receipt of the call, the device registers the caller identification tag, activates an alert mechanism, and displays the caller identification tag. Identification of the caller absent communication with the caller results in response to voice service access being denied.

In a further embodiment, a caller identification device includes: means for receiving a signal from a cellular telephone system; means for connecting to a data channel for receiving data information associated with the signal; means for processing the data information to identify the sender of the signal; means for displaying an identification of the sender; and, means for preventing connection to the voice services of a voice channel adapted to contain voice information associated with the signal. The device receives data information from the cellular telephone system but not voice content and displays the data information to identify the caller.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a device for use on a digital cellular telephone system that identifies a caller by displaying a caller identification number while denying voice access to the caller.

Figure 1:
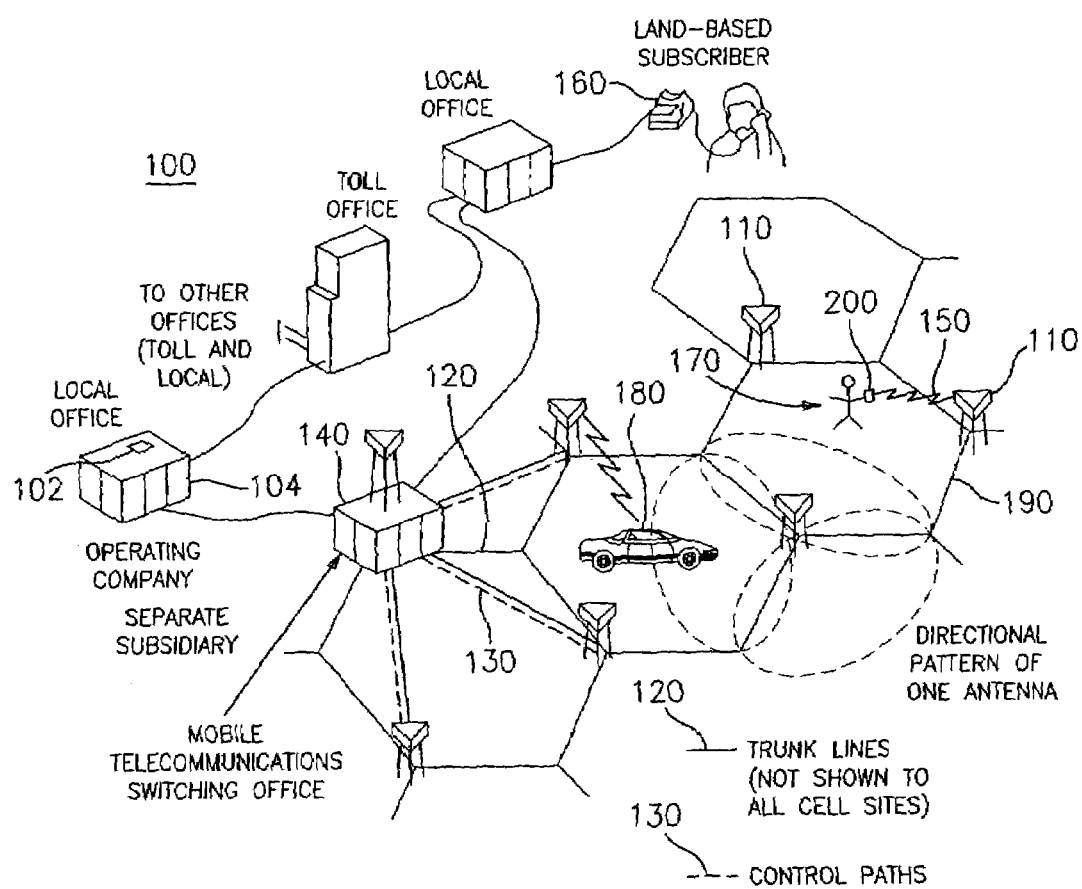
FIG. 1 is an exemplary cellular telephone system for implementing an embodiment of the invention.

FIG. 1 is an exemplary embodiment of a cellular telephone system (CTS) 100 having a network of cell sites 110 in signal communication, via data and voice channels (trunk lines) 120 (not all channels shown) and control paths 130, with a mobile telecommunications switching office (MTSO) 140. The cell sites 110 are in signal communication via RF (radio frequency) signal 150 with a caller identification device (CID) 200 held by user 170. CID 200 may also be operable within an automobile 180, or any other mobile unit. Each cell site 110 contains a tower, an antenna, a radio transceiver and a base station controller (collectively 110) that manages, sends, and receives traffic to and from a CID 200 in its geographical area defined by grid 190 from and to a cellular telephone switch (not shown) and distant MTSO 140. MTSO 140 places calls from land based telephones 160 to wireless customers 170, switches calls between cells as CIDs 200 travel across cell boundaries 190, and authenticates the mobile identification number (MIN) of CID 200.

Figure 2:
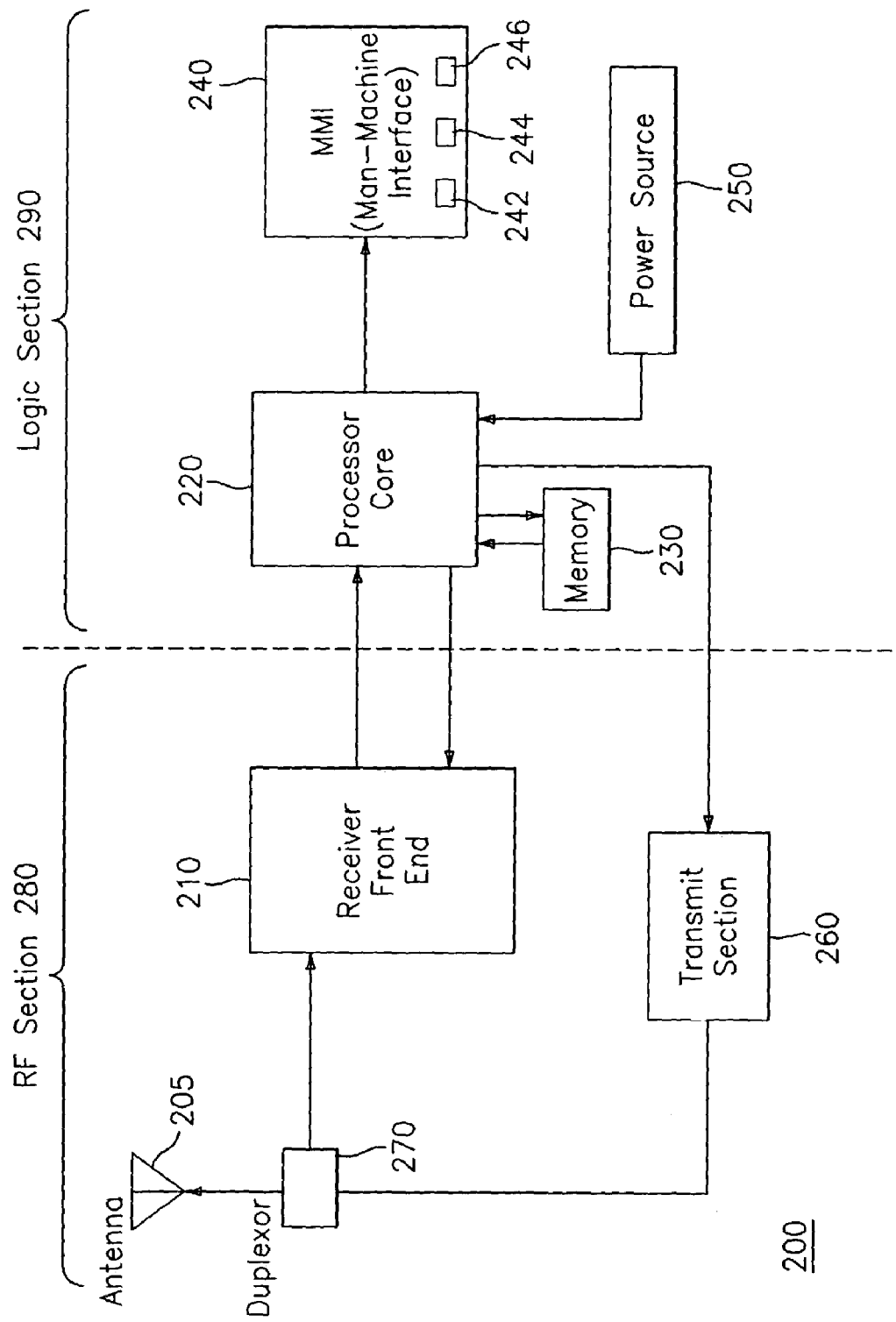
FIG. 2 is a block diagram representation of an exemplary caller identification device in accordance with an embodiment of the invention.

The architecture of an embodiment of CID 200 is depicted in FIG. 2 to include an antenna 205, a duplexor 270, a receiver 210 in signal communication with antenna 205 through duplexor 270, a transmitter 260 in signal communication with antenna 205 through duplexor 270, a processor 220 in signal communication with both receiver 210 and transmitter 260, a memory 230 in signal communication with processor 220, a man-machine interface (MMI) 240 in signal communication with processor 220, and a power source 250, such as a replaceable alkaline battery 252 and power supply circuitry 254 (best seen by referring to FIG. 4) for example, in signal communication with processor 220. Receiver 210 is responsive to signal 150 from CTS 100, where signal 150 includes both data and voice signals from data and voice channels 120. Processor 220 contains a chipset, such as a TDMA (Time Division Multiple Access), CDMA (Code Division Multiple Access), GSM (Global System for Mobile) or AMPS (American Mobile Phone System) chipset for example, that is programmed to identify CID 200 to CTS 100 via a MIN stored in memory 230, which in an embodiment is an EPROM. Memory 230 when used in this manner is referred to as a number assignment module (NAM). Processor 220 is programmed to receive only data signals and no voice signals from data/voice channel 120, thereby negating the need for a speaker, a microphone, a voice signal amplifier, voice signal filters, and a vocoder (voice coder) in CID 200. In an embodiment, the chipset in processor 220 includes an ESN (Electronic Serial Number) with a MIN placed on it. In this manner, the MIN is paired with an ESN for a given CID 220.

Figure 3:
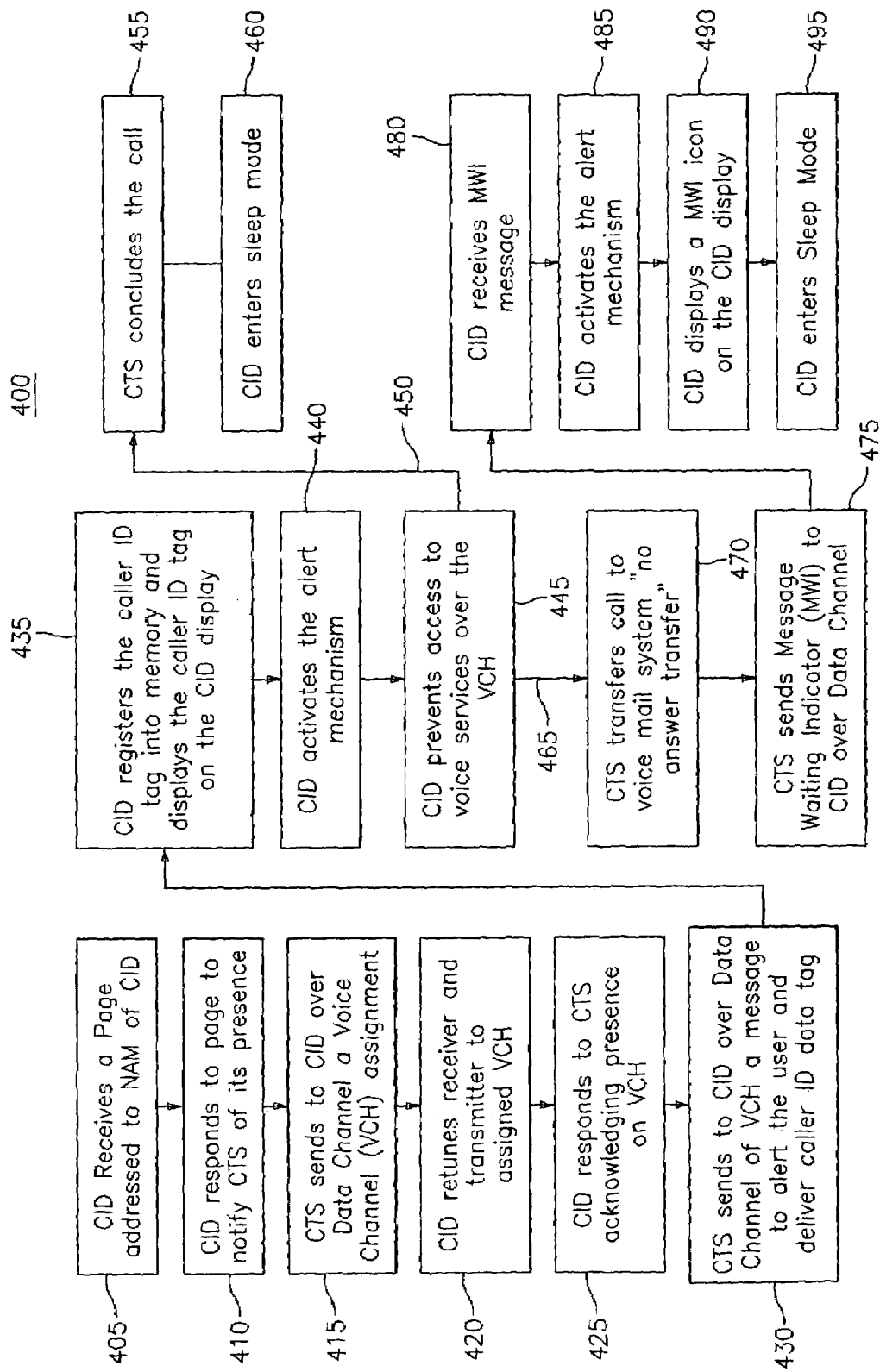
FIG. 3 depicts alternative processes of identifying a caller in accordance with an embodiment of the invention.

Reference is now made to FIGS. 1-3, collectively, where FIG. 1 depicts CTS 100, FIG. 2 depicts CID 200, and FIG. 3 depicts a caller identification process 400. When a call is placed, such as from telephone 160 for example, to the number on NAM 230 of CID 200 at user 170, CTS 100 pages for the NAM 230. Upon receiving the page 405, processor 220 at CID 200 alerts CTS 100 of its location 410 via communication with cell site 110, and MTSO 140 attempts to pass the incoming call to CID 200 by sending a voice channel (VCH) assignment over a data channel 415. Upon receipt of the incoming call, CID 200 retunes receiver 210 and transmitter 260 to the assigned VCH 420 and responds to CTS 100 acknowledging its presence on the VCH 425. In response to the acknowledgement, CTS 100 sends a message to CID 200 over the data channel of the VCH to alert the user 170 and to deliver a caller identification data tag 430. Processor 220, which includes an automatic number identification (ANI) feature that registers 435 the number of the incoming call to memory 230, triggers 440 an alert mechanism at MMI 240, such as a buzzer 242 for example, to notify user 170 of the incoming call, and then sends 435 the number of the incoming call to a display 244 at MMI 240, thereby identifying the caller at 160 to user 170. The incoming call, with caller identification information attached, is typically carried by the data channel 120 until the call is accepted, at which time a voice channel 120 connection is attempted. In this manner, the usage of high capacity voice channels 120 can be avoided until needed. Once the data signal in data channel 120 has been accepted by CID 200, CTS 100 attempts to connect voice services over a voice channel 120 to CID 200. However, since CID 200 is not equipped with voice signal processing circuitry, the connection to the voice services over voice channel 120 fails 445. Upon rejection of the call at CID 200 (process block 445), one embodiment of CID 200 may follow process path 450 where CTS 100 concludes the call 455 and CID 200 enters a sleep mode 460, ready for the next page.

In an alternative embodiment and after process block 445, CID 200 may follow process path 465 where the failure of CID 200 to accept a voice signal on voice channel 120 signals CTS 100 to transfer the call to a voicemail system (a "no answer transfer") 470, which user 170 may access at a later point in time to retrieve the voice message. In response to a voicemail delivery, CTS 100 sends 475 a Message Waiting Indicator (MWI) to CID 200 over data channel 120. CID 200 receives 480 the MWI message, activates 485 the alert mechanism 242 at MMI 240, and displays 490 a MWI indicator, preferably via an icon, on display 244 at MMI 240. Upon completion of the call and completion of the MWI action, processor 220 enters into a sleep mode 495, whereby power saving features are activated until the next page attempt is made by CTS 100. User 170 of CID 200 may elect to retrieve voice messages stored for CID 200 at MTSO 140 of CTS 100 via a lower cost landline phone system. Once such an action takes place, CTS 100 sends a MWI cancellation message 475 to CID 200 over data channel 120. CID 200 receives MWI cancellation message 475 and processor 220 clears (resets) the MWI indicator 490 in display 244. In the manner described, processor 220 is adapted to accept the contents of the data signal in data channel 120 and to reject the voice services content of the voice channel 120. In an alternative embodiment, receiver 210 is adapted to filter out or disregard any voice signals in voice channel 120, thereby also resulting in a failure to receive a voice call.

In addition to buzzer 242 and display 244, an embodiment of CID 200 may also include a plurality of buttons 246 at MMI 240 to provide user input control. Buttons 246 may include a "Mute" button to silence buzzer 242. Additional buttons 246 may include a power ON/OFF toggle button and a message scroll button, for example. The number of buttons 246 is preferably less than the number found on a typical cellular phone, thereby maintaining a compact size for CID 200, with a preferred number of buttons 246 being at least one and no more than twelve, and a more preferred number of buttons 246 being at least two and no more than four. In accordance with the desire to have a compact CID 200, an embodiment includes a one-line screen for display 244, which has sufficient viewing capability for displaying the telephone number of the caller (caller identification).

Figure 4:
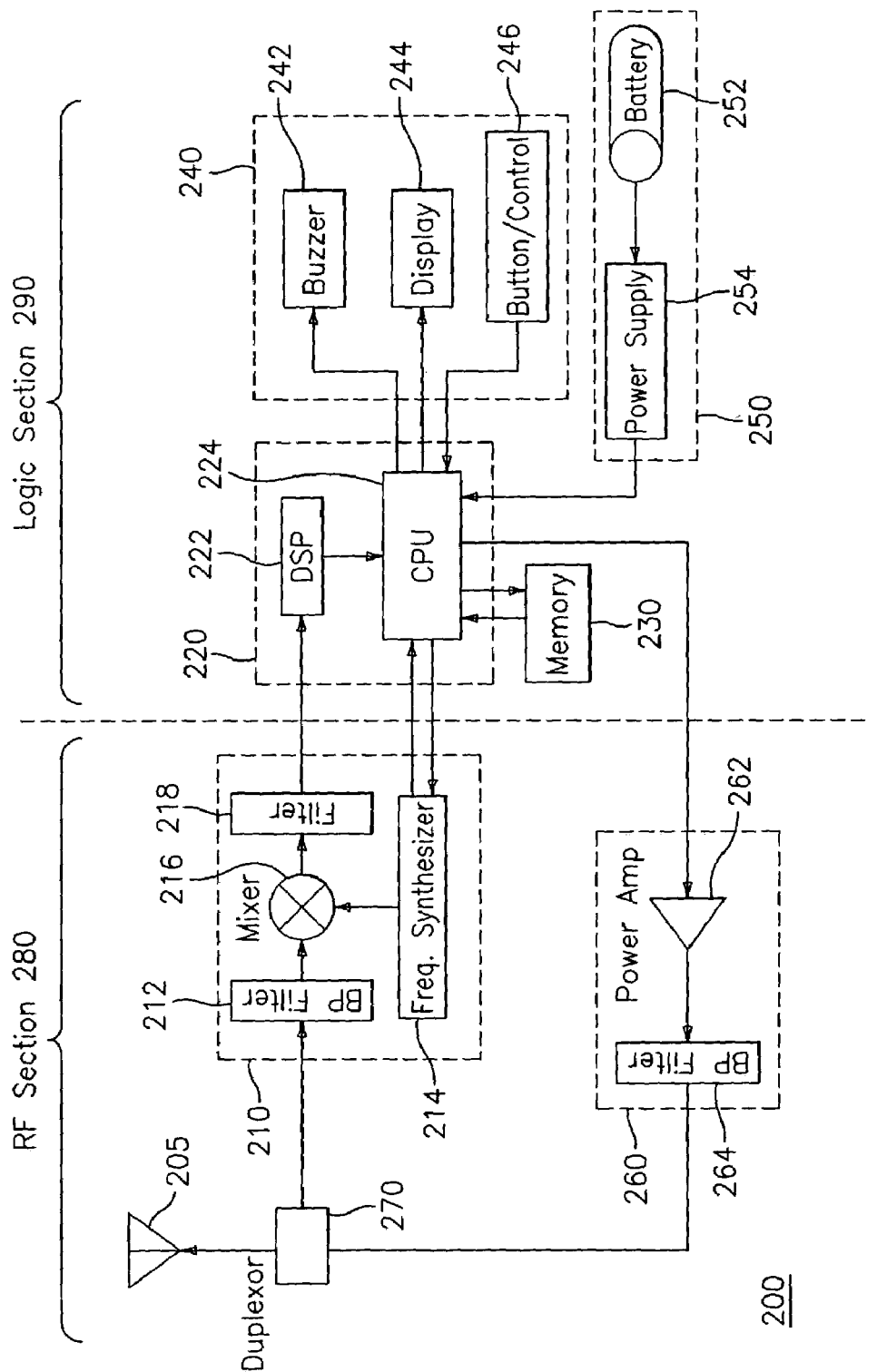
FIG. 4 is a more detailed block diagram representation of the block diagram of FIG. 2.
Figure 5:
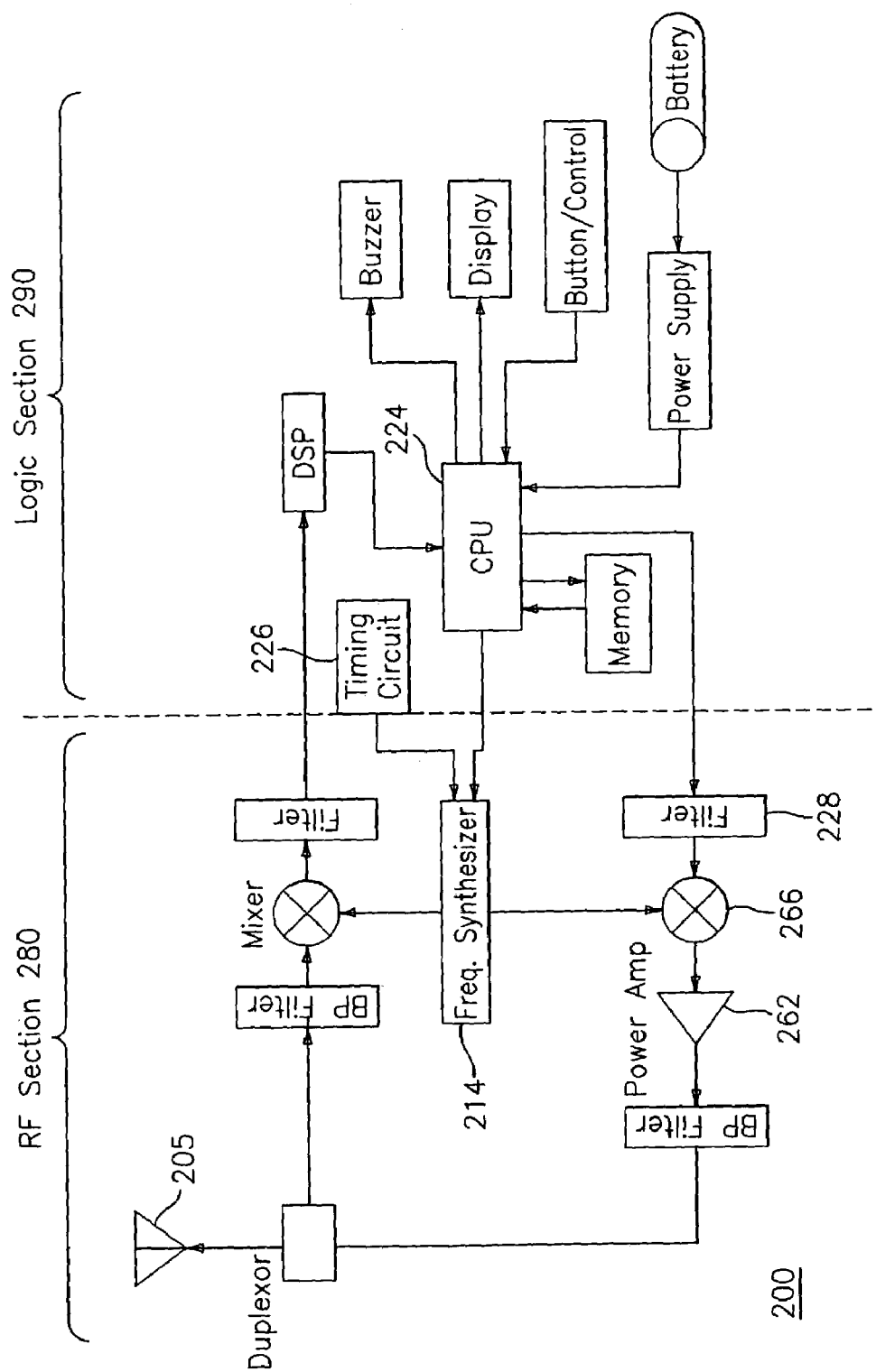
FIG. 5 is an alternative embodiment to the block diagram of FIG. 4.

FIG. 4 depicts a more detailed block diagram of the RF (radio frequency) and logic sections 280, 290, respectively, of the CID 200 of FIG. 2, which has both receive and transmit capability. Included in receiver 210 is a bandpass filter 212 for receiving the incoming signal from antenna 205 and duplexor 270 and for passing desired frequencies into logic section 290, a frequency synthesizer 214 for providing a frequency signal representative of the frequency signature of CID 200, a signal mixer 216 for combining the incoming signal with the frequency signature, and a secondary filter 218 for reducing noise and enhancing signal quality. Processor 220 includes a digital signal processor (DSP) 222 and a central processing unit (CPU) 224 for processing the incoming signal in accordance with the discussion above, and transmitter 260 includes a power amplifier 262 and bandpass filter 264 for amplifying and transmitting a desired signal frequency to the caller via CTS 100. In an alternative embodiment, CPU 224 includes a timing circuit 226 in signal communication with frequency synthesizer 214, and a pre-amplifier filter 228 in signal communication with power amplifier 262, as depicted in FIG. 5. In addition, a signal mixer 266 may be located to receive input signals from frequency synthesizer 214 and filter 228, and to provide an output signal to power amplifier 262, thereby properly modulating the output signal transmitted from antenna 205.

Figure 6:
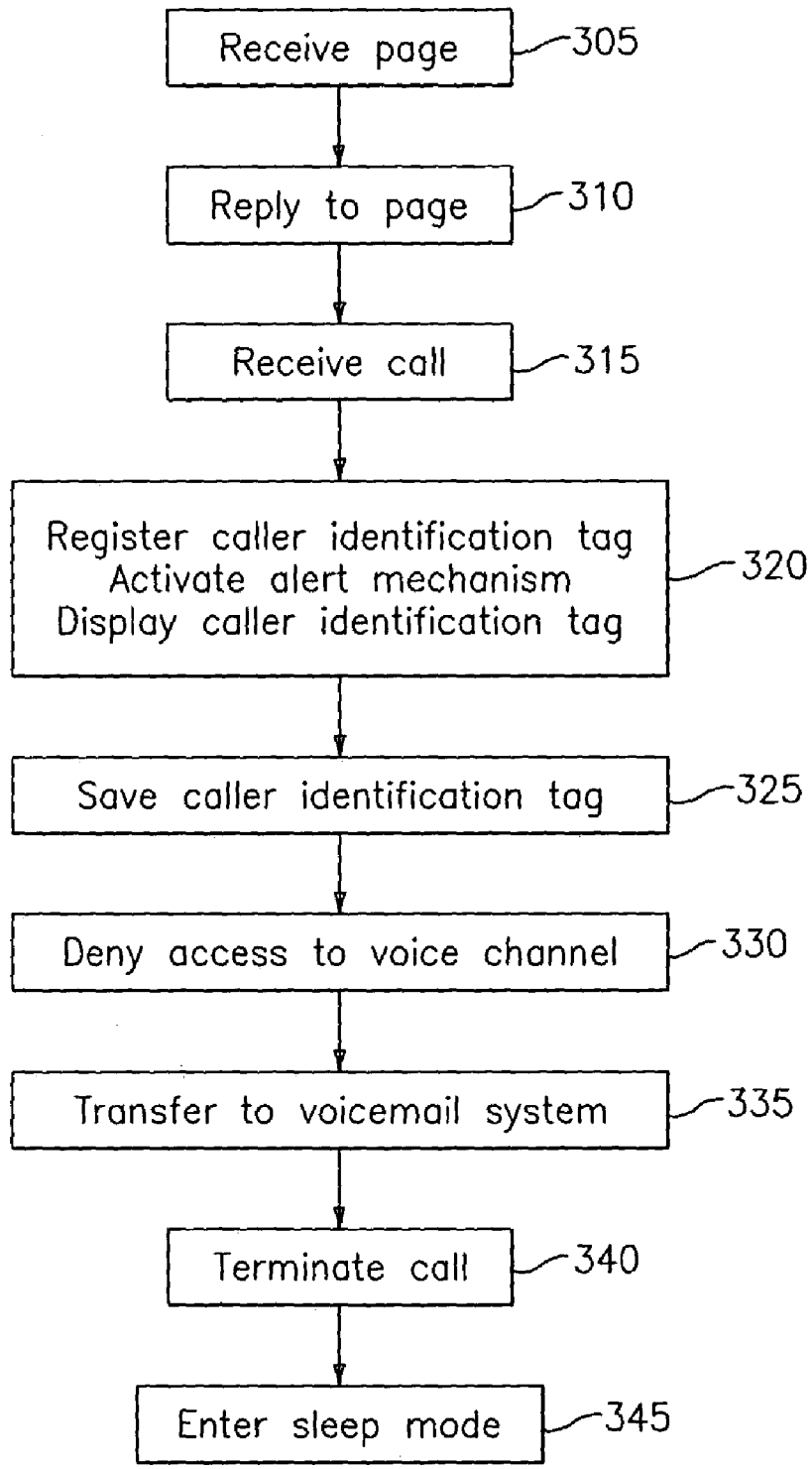
FIG. 6 depicts an alternative process to that of FIG. 3.

An alternative process 300 of identifying a caller using CID 200 in signal communication with CTS 100 is depicted in the process chart of FIG. 6, which begins by CID 200 receiving 305 a page from CTS 100, which operates in accordance with known cellular telephone system practices. As discussed above, CID 200 includes an identification tag, alternatively referred to as an ESN/MIN pair stored at a NAM in memory 230. CID 200 responds by replying 310 to the page with its location, which is determined by the cell site 110 that is in priority communication with CID 200. CTS 100 responds by sending a call that is received 315 at CID 200, the call having a data signal associated with a data channel and a voice signal associated with a voice channel, where voice services on the voice channel become available from CTS 100 only if the data signal is answered by the receiving device. Upon receiving the data signal, CID 200 registers 320 the caller identification tag utilizing an ANI feature at processor 220, activates 320 an alert mechanism 242 to notify the bearer of CID 200 of an incoming call, and displays 320 the caller identification tag at display 242. The caller identification tag may optionally be saved 325 at memory 230 for subsequent viewing. Since CID 200 is not equipped with voice communication, the voice services from CTS 100 are not available, thereby denying 330 access to the voice services on the voice channel that is adapted to carry the voice signal of the caller. In an alternative embodiment, CID 200 includes a feature that transfers 335 the caller's voice signal (voice message) to a voicemail system at the subscriber's mailbox 102 in an office 104 of CTS 100. The call is terminated 340 after CID 200 fails to answer and the voicemail system is optionally activated. Upon call completion, CID 200 enters 345 into "sleep" mode where it awaits another page from CTS 100.

Some embodiments of the invention have some of the following advantages: low purchase cost associated with the hardware; low maintenance cost associated with data channel demands but no, or very low, voice channel demands; low capital expense associated with the use of existing cellular infrastructure and the use of existing overhead frequencies; low production cost resulting from the absence of a full size display screen, a full size keypad, a speaker/microphone set, a speaker/microphone amplifier, a vocoder, a rechargeable battery, and a charging circuit; and, low production cost resulting from reduced functional testing and reduced plastic usage.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of identifying a caller at a device in signal communication with a cellular telephone system, comprising:
   receiving a page at the device from the cellular telephone system, the device having an identification tag;
   replying to the page with the location of the device;
   receiving a call having at least one of a data signal and a voice signal at the device in response to the reply to the page;
   registering a caller identification tag, activating an alert mechanism, and displaying the caller identification tag at the device in response to the received data signal;
   denying access to the voice services of a voice channel adapted to contain the voice signal to prevent establishment of a voice call;
   receiving at the device a voice channel assignment in response to the reply to the page and before receiving the call;
   returning at least one of receiver and a transmitter to the assigned voice channel; and
   acknowledging to the cellular telephone system the presence of the device on the voice channel;
   wherein a received cellular call is processed at the device for data signal content but not for voice services, thereby enabling identification of the caller absent voice communication with the caller.

2. The method of claim 1, further comprising:
   saving the caller identification tag at the device for subsequent viewing.

3. The method of claim 1, further comprising:
   denying access to voice service on the voice channel by not completing the call at the device.

4. The method of claim 3, further comprising:
   transferring the voice signal of the call to a voicemail system.

5. The method of claim 3, further comprising:
   changing the state of the device to sleep mode in preparation of receiving another page from the cellular telephone system.

6. The method of claim 4, further comprising:
   sending a message waiting indicator to the device;
   receiving the message waiting indicator at the device;
   activating the alert mechanism at the device; and
   displaying a message waiting indicator icon at the device.

7. The method of claim 4, further comprising:
   sending a clear message waiting indicator to the device;
   receiving the clear message waiting indicator at the device;
   erasing a message waiting indicator icon at the device.

* * * * *